XR 3,267,209
SEARCH ROOM
2
[redacted]
SUBSTITUTE FOR MISSING XR

Aug. 16, 1966 KYOZO NAGAMORI ETAL 3,267,209

COLORED IMAGE REPRODUCTION DEVICE

Filed Feb. 15, 1963 2 Sheets-Sheet 1

INVENTORS
KYOZO NAGAMORI
KAZUO KIKUCHI
BY
Hopgood & Calimafde
ATTORNEYS

INVENTORS
KYOZO NAGAMORI
KAZUO KIKUCHI
BY
Hopgood & Calimafde
ATTORNEYS

United States Patent Office 3,267,209 Patented August 16, 1966

3,267,209
COLORED IMAGE REPRODUCTION DEVICE

Kyozo Nagamori and Kazuo Kikuchi, Tokyo, Japan, assignors to Nippon Electric Company Limited, Tokyo, Japan, a corporation of Japan Filed Feb. 15, 1963, Ser. No. 258,786
Claims priority, application Japan, Feb. 20, 1962, 37/6,679
3 Claims. (Cl. 178—5.4)

This invention relates to an image reproduction device for use in image reproduction systems and more particularly, to a device for reproducing either visually or physically a colored image received from signals representing colored picture elements.

Figures 1, 2, 3, 4:
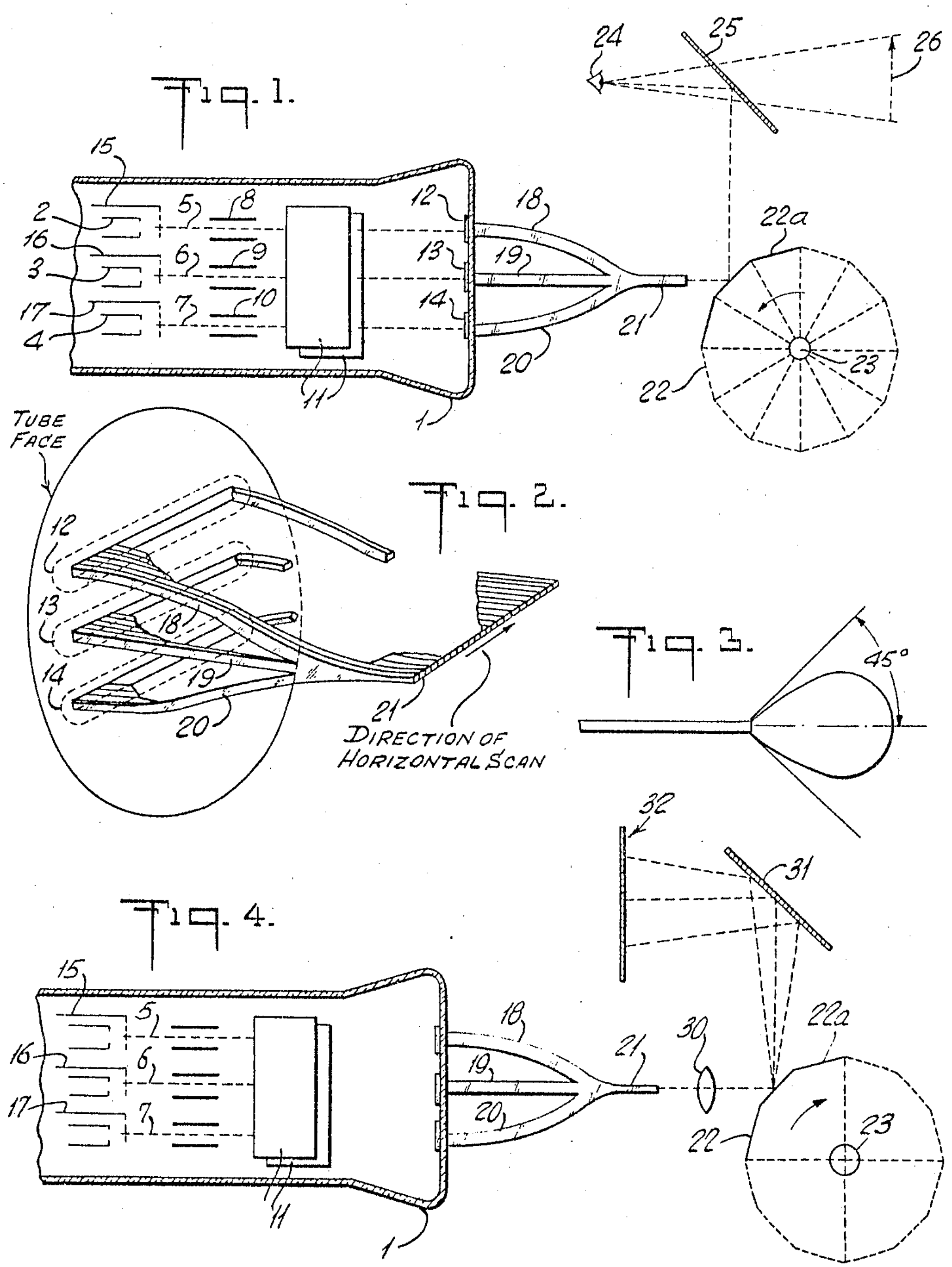
Figure 5A:
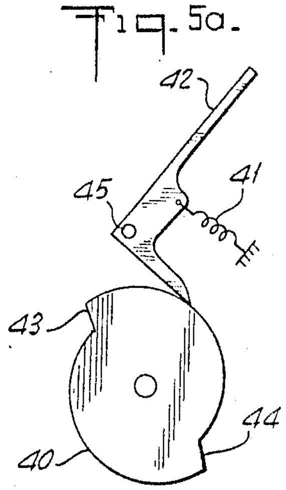
Figure 5B:
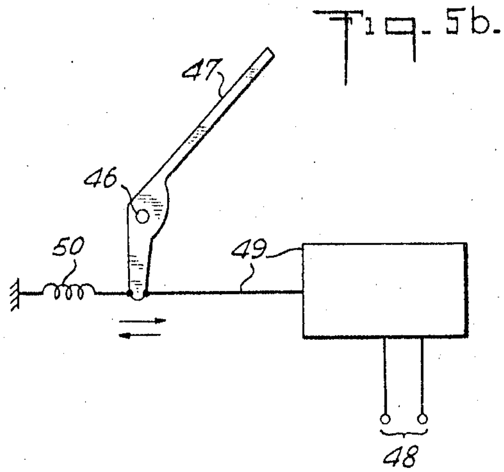
Figure 6:
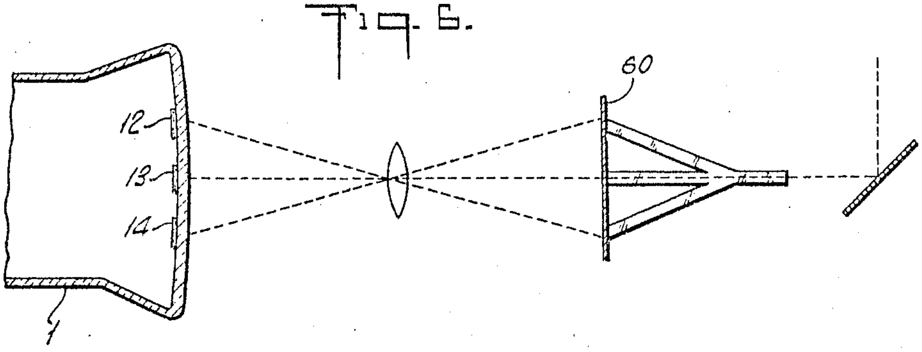
Figure 7A:
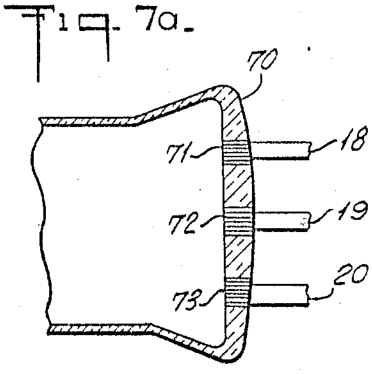
Figure 7B:
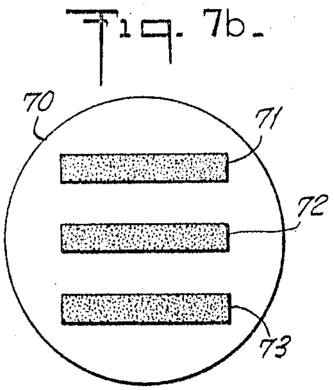

The principles of the invention will now be explained in connection with its application to a color television receiver and with reference to the accompanying drawings, in which:

FIG. 1 is a schematic vertical sectional view of an embodiment of the invention, FIG. 2 is a perspective view of light conducting elements shown in the embodiment of FIG. 1, FIG. 3 shows the distribution pattern of the output light of a light conducting element, FIG. 4 is a schematic vertical sectional view of another embodiment of the invention, FIGS. 5(*a*) and 5(*b*) show arrangements for effecting vertical scanning of the image, FIG. 6 shows a modification which may be utilized with any one of the embodiments, and FIGS. 7(*a*) and 7(*b*) show another modification which may also be utilized with either of the embodiments.

Referring now to FIG. 1, a picture tube 1 having three electron guns 2, 3 and 4 is shown, with those parts which are unnecessary for the understanding of the invention removed. Electron beams 5, 6 and 7 emitted from the electron guns and controlled by control electrodes 15, 16 and 17 in accordance with color signals pass between three pairs of vertical position adjusting deflection plates 8, 9 and 10, respectively, and then between a pair of horizontal deflecting plates 11 to impinge the fluorescent screen at portions 12, 13 and 14, respectively. As illustrated in FIG. 2, the portions or rows 12, 13 and 14 extend horizontally over the entire effective width of the fluorescent screen and comprise different type fluorescent materials so as to emit respectively, red, green and blue light of intensities which correspond to the respective instantaneous control voltages imposed on the control electrodes 15, 16 and 17. Light conducting elements 18, 19 and 20 having small diameters are arranged in the respective rows, so as to transfer from their ends facing the portions 12, 13 and 14, respectively, the light emitted therefrom, through the corresponding light conducting elements to the composite ends 21 where rays of colored light may be obtained. As will be clear from FIGS. 1 and 2, if red, green and blue color signals produced in a conventional color television receiver are applied to the control electrode 15, 16 and 17, respectively, and if the horizontal deflection signal is applied to the horizontal deflecting plates 11, raster lines of the colored picture are scanned at the output ends 21 of the light conducting elements, from left to right, for example.

As shown in FIG. 1, a polyhedral mirror 22 is arranged for rotation about an axis 23 thereof. If the revolution of the mirror 22 is in synchronism with the frame frequency of the picture and if the afterimage or persistence time of the fluorescent screen is in suitable relation to the time of the horizontal scanning, an observer 24 can see by means of a reflector 25 a colored image 26 shown in its apparent position, because the luminous flux output of a light conducting element usually shows a distribution, see FIG. 3, such that the luminous flux is distributed uniformly over a range of angles. It is to be noted here that the frame frequency is sufficiently low to allow a mechanically rotated mirror to be in complete synchronism.

The shape of the cross section of the light conducting elements 18, 19 and 20 are, although preferably either circular or rectangular, not restricted to such shape. The number of the light conducting elements in the horizontal direction must be sufficiently large so that they may at least have a pitch corresponding to that of the picture elements of the image to be reproduced. Conventional light fibers are sufficient to produce a high resolving power. The provision of a scattering plate, such as a ground glass plate, placed in direct contact with the output ends 21 of the light conducting elements is effective for making the distribution of the luminous flux uniform.

Referring now to FIG. 4 which shows a projection type television receiver for use in another embodiment of the invention, it will be seen that an enlarged image can be obtained at the front or back of a projection screen 32 if the light output from the output ends 21 of the light conducting elements is arranged to converge by way of a lens 30 to focus through a rotating mirror 22 and a plane mirror 31 on the projection screen. It is sometimes preferable for simplifying the optical system and, in particular, the lens system, to shorten the length of the row of the output ends 21 of the light conducting elements by making the diameter of the output ends smaller than that of the input ends. Conversely, it is preferable in some cases, such as in FIG. 1, to make the cross-sectional area of the output ends 21 larger with a view to magnifying the image.

Both of the embodiments described above can be adapted for interlace scanning, by disposing alternate mirror surfaces or elements 22*a* of the rotating mirror 22 slightly nearer to the center axis. Also, use of flexible material for the light conducting elements is advantageous for particular optical system designs.

Vertical scanning can also be performed by using, in place of the rotating mirror shown in FIGS. 1 or 4, a vibrating plane mirror. Referring to FIG. 5(*a*), vertical scanning is achieved by a plane mirror 42 pivotally vibrated about an axis 45 by means of a coil spring 41 and a cam 40 rotated in synchronism with the frame frequency. In this case, interlace scanning can be achieved by slight misalignment between cam surfaces 43 and 44. Referring now to FIG. 5(*b*), a plane mirror 47 is vibrated about an axis 46 by a coil spring 50 and an electromagnetic driving means 49 driven by the vertical scanning signal supplied to input terminals 48.

As illustrated in FIG. 6, it is generally known that the glass layer which lies between the outer front surface of the picture tube and the fluorescent screen has considerable thickness and accordingly that the input ends of the light conducting elements can not be brought into direct contact with the fluorescent screen. This fact results in some defocusing of the obtained image. Such defocusing can be remedied by first obtaining an image, as shown in FIG. 6, by means of a plane lens 60, and then synthetizing the color by the light conducting elements in the above described manner. It is, however, unavoidable that the luminous intensity of the image is somewhat reduced due to a decrease in the quantity of the incident light. A more preferable arrangement is shown in FIGS. 7(*a*) and 7(*b*), wherein portions of the front bulb wall 70 of the picture tube comprise bundles of light fibers 71, 72 and 73 and wherein the inside surface of such portions are covered with fluorescent materials for the three primary colors, respectively, whereby the emitted light is transmitted to the outer surface without scattering. By bringing the input ends of the light conducting elements 18, 19 and 20 into direct contact with the front outer surface of the picture tube, the defocusing of the image can be avoided and at the same time the luminous flux developed by the fluorescent screen can be utilized fully.

Although the invention has been explained in conjunction with two embodiments wherein the picture tube is provided with a fluorescent screen for the three primary colors, the objects of the invention can also be attained with a picture tube having a conventional black-and-white fluorescent screen, and by interposing filters for the three primary colors or by providing the input ends of the light conducting elements with suitable red, green and blue filters.

While a picture tube having a tri-color fluorescent screen is used in the embodiments so far described, the invention can also be carried out with the use of three picture tubes for producing red, green and blue fluorescent light, respectively.

It will also be appreciated that the principles of the invention are applicable to telephotography wherein the speed of scanning is much slower than that of television. In such application omission of the optical system and resulting simplification of the device are possible by way of synchronized vertical driving of a photographic film or printing paper in direct contact with the output ends 21 of the light conducting elements where the composite light output from the three primary colors is produced.

While the invention has been described in connection with specific embodiments and modifications, it is to be clearly understood that such description has been made only by way of example and not as a limitation of the scope of the invention and that other modifications are possible without departing from the spirit of the invention set forth in the accompanying claims.

What is claimed is:

1. A colored image reproduction system comprising an electron flow device having independent fluorescent screen portions each for emitting fluorescent light of one of three primary colors, means for synchronously scanning each of said screen portions with an electron beam to thereby develop fluorescent light therefrom, a light conducting structure for transmitting said fluorescent light, said structure comprising a plurality of similarly shaped single piece light conducting elements in contiguous relationship with one another, each single piece element being formed of a plurality of input branches terminating in a single output port, each of the input branches of a given single piece element being positioned for receiving a different color light from the different screen portions to provide a synthesized light output at each output port, and an optical system including a mechanism for vertically scanning the light output at the output ports, said optical system including means between said fluorescent screen portions and said light conducting elements for substantially reducing defocusing of the reproduced image.

2. A colored image reproduction system comprising a cathode ray tube having on the internal surface of its face independent fluorescent screen portions of elongated shape each for emitting fluorescent light of one of three primary colors, means for synchronously scanning each of said screen portions with an electron beam to thereby develop fluorescent light therefrom, a light conducting structure for transmitting said fluorescent light, said structure comprising a plurality of similarly shaped single piece light conducting elements in contiguous relationship with one another, each single piece element being formed of a plurality of input branches terminating in a single output port, each of the input branches of a given single piece element being positioned for receiving a different color light from the different screen portions to provide a synthesized light output at each output port, and an optical system including a mechanism for vertically scanning the light output at the output.

3. The invention described in claim 2 wherein the face of said tube includes independent light conducting regions adjacent said screen portions for conducting light through said face from said screen portions to said light conducting elements, whereby dispersion of light by said face is substantially reduced and defocusing of the image produced is substantially eliminated.

References Cited by the Examiner

UNITED STATES PATENTS

| | | | |
|---|---|---|---|
| 2,598,941 | 6/1952 | Roth | 178—7.86 X |
| 3,043,179 | 7/1962 | Dunn | 88—1 |

DAVID G. REDINBAUGH, *Primary Examiner.*

J. H. SCOTT, *Assistant Examiner.*